US011163354B2

United States Patent
Kawakita (10) Patent No.: US 11,163,354 B2
(45) Date of Patent: Nov. 2, 2021

(54) INFORMATION PROCESSING APPARATUS, AND CONTROL METHOD (71) Applicant: LENOVO (SINGAPORE) PTE. LTD., Singapore (SG)

(72) Inventor: Koji Kawakita, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 97 days.

(21) Appl. No.: 16/849,521

(22) Filed: Apr. 15, 2020

(65) Prior Publication Data

US 2021/0181826 A1 Jun. 17, 2021

(30) Foreign Application Priority Data

Dec. 12, 2019 (JP) .............................. JP2019224212

(51) Int. Cl.
*G06F 1/00* (2006.01)
*G06F 1/3234* (2019.01)
*G06F 1/16* (2006.01)
*G06F 3/16* (2006.01)
*G06F 1/3212* (2019.01)
*G06F 1/3287* (2019.01)

(52) U.S. Cl.
CPC .......... *G06F 1/3265* (2013.01); *G06F 1/1618* (2013.01); *G06F 1/3212* (2013.01); *G06F 1/3287* (2013.01); *G06F 3/167* (2013.01)

(58) Field of Classification Search
CPC ...... G06F 1/3265; G06F 1/1618; G06F 3/167; G06F 1/3212; G06F 1/3287; G06F 1/3206; G06F 1/3234; G06F 1/3231
See application file for complete search history.

(56) References Cited

U.S. PATENT DOCUMENTS

| 2010/0182265 A1* | 7/2010 | Kim | G06F 1/1641 345/173 |
| 2015/0052375 A1* | 2/2015 | Deng | G06F 1/3234 713/323 |
| 2015/0055802 A1* | 2/2015 | Tu | G06F 3/167 381/110 |
| 2015/0207925 A1* | 7/2015 | Ku | H04M 1/72469 715/810 |
| 2016/0095072 A1* | 3/2016 | Lee | H04W 4/027 455/418 |
| 2016/0274722 A1* | 9/2016 | Putzolu | G06F 3/03547 |

(Continued)

FOREIGN PATENT DOCUMENTS

JP 2019174783 A 10/2019

*Primary Examiner* — Xuxing Chen
(74) *Attorney, Agent, or Firm* — Shimokaji IP (57) ABSTRACT

An information processing apparatus includes: a first chassis having a display unit; a second chassis having an input unit; a rotation mechanism which makes the first chassis rotatable with respect to the second chassis; a mode control unit which, when a tent mode is detected as a state where the first chassis and the second chassis are folded back to back, disables the permission of transition to a sleeping state, and enables a voice input function from a normal processing mode to change to a voice input processing mode in which a processing state of the system is maintained; and a power setting processing unit which changes, in the voice input processing mode, the setting of maximum power consumption to a setting lower than a setting in the normal processing mode.

7 Claims, 7 Drawing Sheets (56) References Cited

U.S. PATENT DOCUMENTS

| | | | |
|---|---|---|---|
| 2017/0352352 A1* | 12/2017 | Wang | G10L 25/72 |
| 2019/0041919 A1* | 2/2019 | Makinen | G06F 1/1681 |
| 2021/0191491 A1* | 6/2021 | Thong | G06F 1/3206 |

* cited by examiner

INFORMATION PROCESSING APPARATUS, AND CONTROL METHOD

FIELD OF THE INVENTION

The present invention relates to an information processing apparatus and a control method.

BACKGROUND OF THE INVENTION

Recently, smart speakers used by users to input voice in order to execute various processing have become popular. Among the smart speakers, there is known a smart speaker having a display function to provide information including images to a user (see Japanese Unexamined Patent Application Publication No. 2019-174783).

SUMMARY OF THE INVENTION

In the meantime, when the above-described smart speaker with the display function is realized on an information processing apparatus such as a laptop personal computer (hereinafter referred to as the laptop PC), a convenience problem may arise, such as a short available time upon running on a battery.

The present invention has been made to solve the above problem, and it is an object thereof to provide an information processing apparatus and a control method capable of improving convenience.

In order to solve the above problem, an information processing apparatus according to one aspect of the present invention includes: a first chassis having at least a display unit; a second chassis having at least an input unit; a rotation mechanism which makes the first chassis rotatable with respect to the second chassis while coupling the first chassis and the second chassis; a mode control unit which, when a tent mode is detected as a state where the first chassis and the second chassis are folded back through the rotation mechanism with a display surface of the display unit and the input unit on the outside, disables the permission of transition to a sleeping state in which at least part of system processing is stopped when the display of the display unit is suspended, and enables a voice input function from a normal processing mode to change to a voice input processing mode in which a processing state of the system is maintained; and a power setting processing unit which changes, in the voice input processing mode, the setting of maximum power consumption to a setting lower than a setting in the normal processing mode.

The above information processing apparatus according to the one aspect of the present invention may further include a user detection unit which detects whether a user is present within a predetermined detection range or not, wherein when the user detection unit detects that the user is present within the predetermined detection range in the voice input processing mode, the mode control unit provides the display of the display unit, while when the user detection unit detects that the user is not present within the predetermined detection range, the mode control unit suspends the display of the display unit.

The above information processing apparatus according to the one aspect of the present invention may also be such that, upon changing to the voice input processing mode, the mode control unit suspends an application being executed before the change, while upon changing from the voice input processing mode to the normal processing mode, the mode control unit resumes the application being executed before the change.

The above information processing apparatus according to the one aspect of the present invention may further be such that, when the information processing apparatus is in the voice input processing mode and operated by power supplied from a battery, the power setting processing unit changes the setting of the maximum power consumption to the setting lower than the setting in the normal processing mode.

Further, the above information processing apparatus according to the one aspect of the present invention may be such that, in a case where the information processing apparatus is in the voice input processing mode and operated by power supplied from a battery, when the remaining power of the battery becomes a predetermined remaining power capable of executing processing in the normal processing mode or lower, the mode control unit cancels the voice input processing mode, and changes to a hibernation state in which a state before halting the system is saved to a storage unit, and power supply is shut down.

Further, the above information processing apparatus according to the one aspect of the present invention may be such that, when a release of the tent mode is detected, the mode control unit returns to the normal processing mode before changing to the voice input processing mode, and when returning to the normal processing mode before the change, the power setting processing unit changes the setting of the maximum power consumption to a setting before changing to the voice input processing mode.

A control method according to another aspect of the present invention is a control method for an information processing apparatus including: a first chassis having at least a display unit; a second chassis having at least an input unit; and a rotation mechanism which makes the first chassis rotatable with respect to the second chassis while coupling the first chassis and the second chassis, the control method including: a mode control step in which, when a tent mode is detected as a state where the first chassis and the second chassis are folded back through the rotation mechanism with a display surface of the display unit and the input unit on the outside, a mode control unit disables the permission of transition to a sleeping state in which at least part of system processing is stopped when the display of the display unit is suspended, and enables a voice input function from a normal processing mode to change to a voice input processing mode in which a processing state of the system is maintained; and a power setting processing step of causing a power setting processing unit to change, in the voice input processing mode, the setting of maximum power consumption to a setting lower than a setting in the normal processing mode.

The above-described aspects of the present invention can improve convenience.

DETAILED DESCRIPTION OF THE INVENTION

An information processing apparatus and a control method according to one embodiment of the present invention will be described below with reference to the accompanying drawings.

Figure 1:
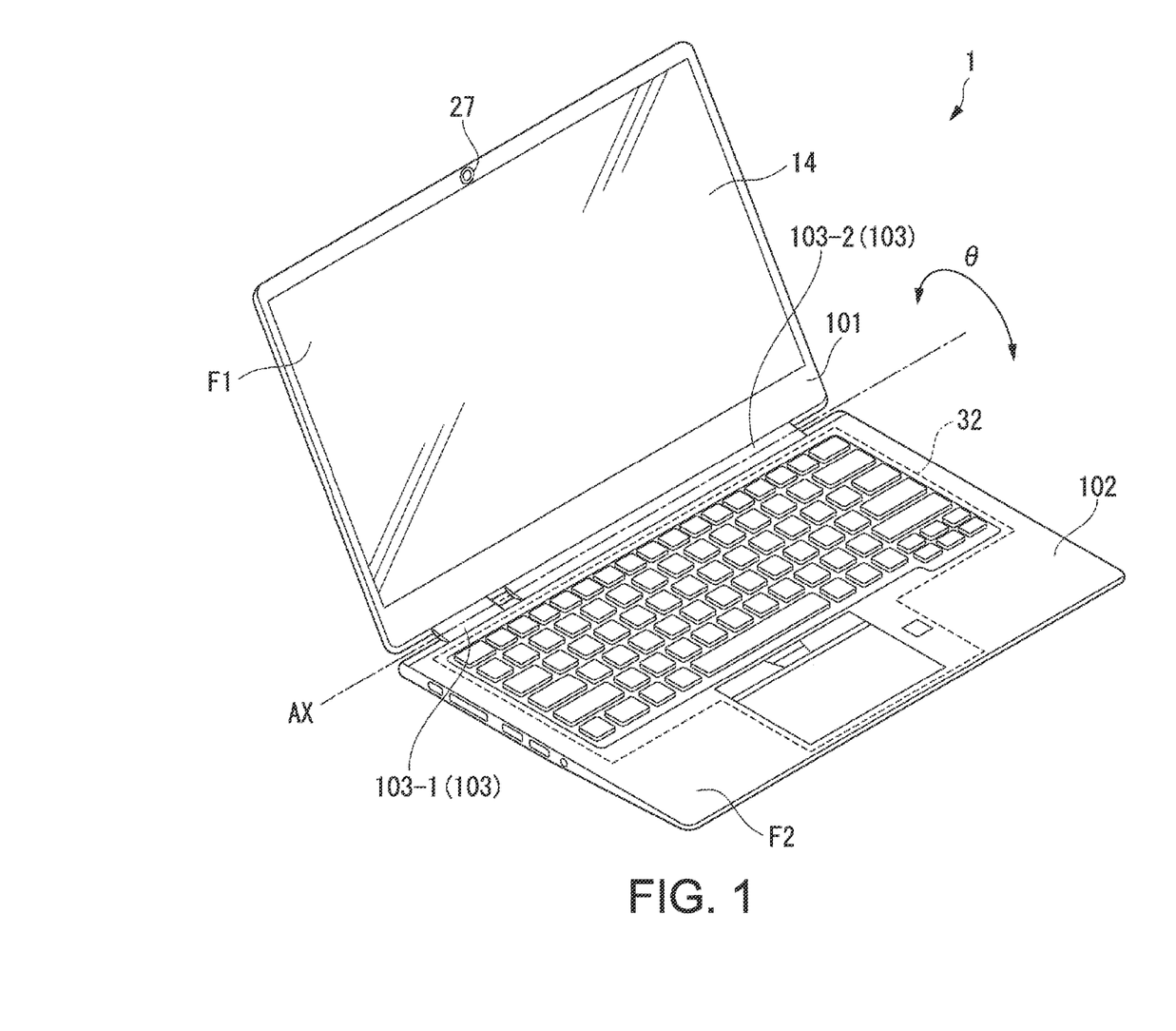
FIG. 1 is an external view illustrating an example of a laptop PC according to an embodiment.

FIG. 1 is an external view illustrating an example of a laptop PC 1 according to the embodiment. In the embodiment, the laptop PC 1 will be described as an example of the information processing apparatus.

As illustrated in FIG. 1, the laptop PC 1 includes a first chassis 101, a second chassis 102, and a hinge mechanism 103.

The first chassis 101 is a chassis equipped with a display unit 14 and a camera 27, which is connected to the second chassis 102 by the hinge mechanism 103. The display unit 14 is so arranged on the first chassis 101 that a display surface F1 of the display unit 14 will be visible. The camera 27 is arranged on the same surface of the first chassis 101 as the display surface F1 of the display unit 14.

The second chassis 102 is a chassis having an input unit 32 including at least a keyboard. The second chassis 102 is connected to the first chassis 101 by the hinge mechanism 103. The second chassis 102 is such that the input unit 32 is arranged on a surface F2, and a motherboard with the main hardware of the laptop PC 1 thereon is stored inside the chassis.

The hinge mechanism 103 (an example of a rotation mechanism) makes the first chassis 101 rotatable about a rotation axis AX with respect to the second chassis 102 while coupling the first chassis 101 and the second chassis 102. In the embodiment, although the laptop PC 1 includes two hinge mechanisms, that is, a hinge mechanism 103-1 and a hinge mechanism 103-2, the hinge mechanisms will be described as the hinge mechanism 103 below unless otherwise specified or when any of the hinge mechanisms is indicated.

In the following description, the angle between the surface (display surface F1) of the first chassis 101 and the surface F2 of the second chassis 102 is called an opening angle θ. The hinge mechanism 103 can rotate the first chassis 101 in a range of opening angles θ from 0 degrees up to 360 degrees, and can maintain any opening angle θ even when some torque is applied.

In such a structure, the laptop PC 1 can change use modes (usage forms) according to the opening angle θ. For example, when the opening angle θ is 0 degrees, the laptop PC 1 is in a closed mode, while when the opening angle θ is 360 degrees, the laptop PC 1 is in a tablet mode. Further, for example, when the opening angle θ is larger than 0 degrees and smaller than 190 degrees (0 degrees<θ<190 degrees), the laptop PC 1 is in a laptop mode, and when the opening angle θ is larger than or equal to 190 degrees and smaller than 360 degrees (190 degrees≤θ<360 degrees), the laptop PC 1 is in a tent mode.

Here, in the example illustrated in FIG. 1, the opening angle θ is larger than 0 degrees and smaller than 190 degrees, which corresponds to the laptop mode.

Figure 2:
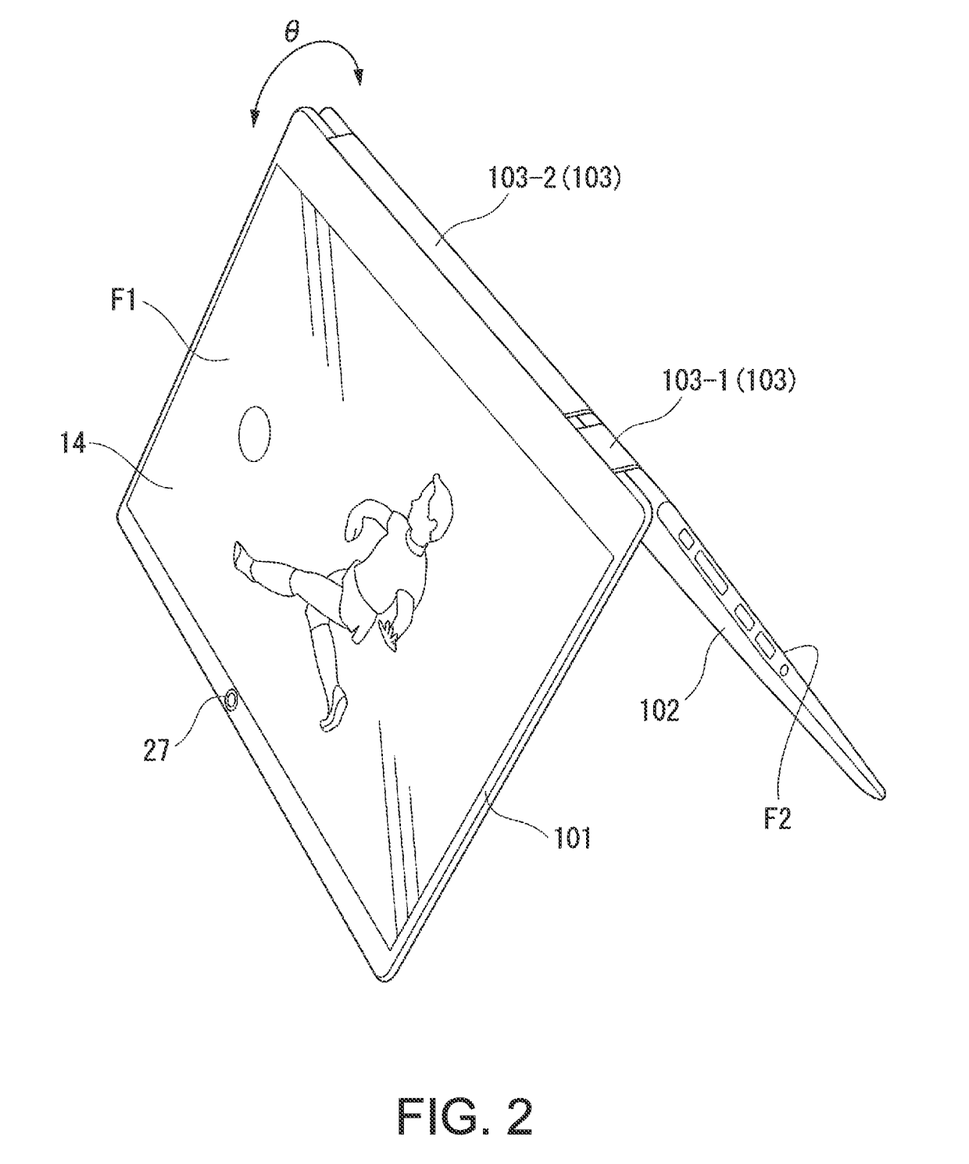
FIG. 2 is an external view illustrating an example of a tent mode of the laptop PC according to the embodiment.

FIG. 2 is an external view illustrating an example of the tent mode of the laptop PC 1 according to the embodiment.

As illustrated in FIG. 2, in the tent mode, the laptop PC 1 is in a state where the first chassis 101 and the second chassis 102 are folded back through the hinge mechanism 103 with the display surface F1 of the display unit 14 on the outside, and placed in such a manner that the sides of the first chassis 101 and the second chassis 102 opposite to the hinge mechanism 103 are put down like a tent. Here, the tent mode is a state where the first chassis 101 and the second chassis 102 are folded back through the hinge mechanism 103 in such a manner that the display surface of the display unit 14 and the input unit 32 are on the outside. The laptop PC 1 according to the embodiment is put into the tent mode to operate in a show mode in which the laptop PC 1 functions as a smart speaker having a display function. Note that the details of the show mode will be described later.

Figure 3:
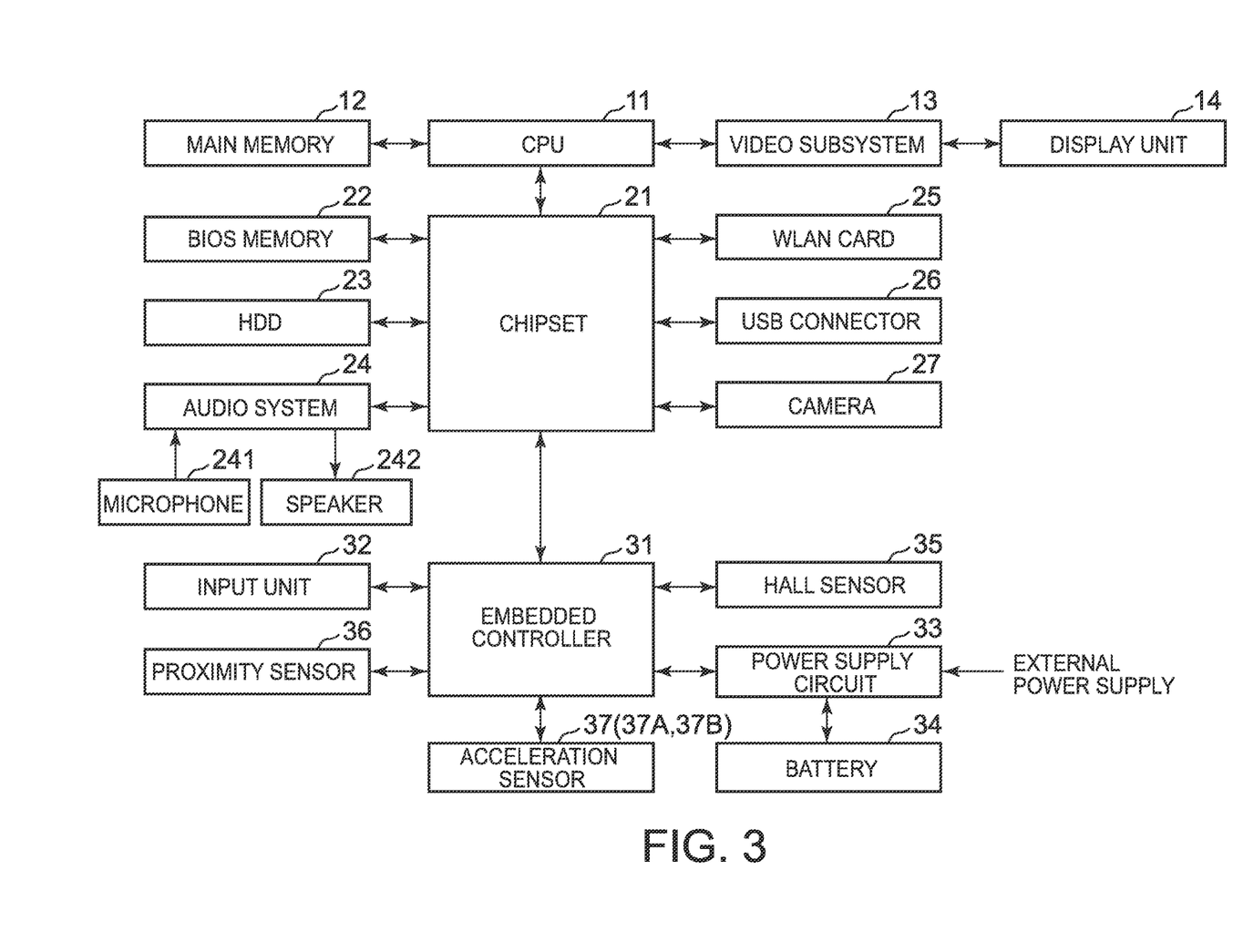
FIG. 3 is a block diagram illustrating an example of the main hardware configuration of the laptop PC according to the embodiment.

Referring next to FIG. 3, the main hardware configuration of the laptop PC 1 will be described.

FIG. 3 is a block diagram illustrating an example of the main hardware configuration of the laptop PC 1 according to the embodiment.

As illustrated in FIG. 3, the laptop PC 1 includes a CPU 11, a main memory 12, a video subsystem 13, a display unit 14, a chipset 21, a BIOS memory 22, an HDD 23, an audio system 24, a WLAN card 25, a USB connector 26, a camera 27, an embedded controller 31, an input unit 32, a power supply circuit 33, a battery 34, a Hall sensor 35, a proximity sensor 36, and an acceleration sensor 37.

The CPU (Central Processing Unit) 11 executes various kinds of arithmetic processing by program control to control the entire laptop PC 1.

The main memory 12 is a writable memory used as reading areas of execution programs of the CPU 11 or working areas to which processing data of the execution programs are written. For example, the main memory 12 is configured to include plural DRAM (Dynamic Random Access Memory) chips. The execution programs include an OS (Operating System), various device drivers for hardware-operating peripheral devices, various services/utilities, application programs, and the like.

The video subsystem 13 is a subsystem for realizing functions associated with image display, which includes a video controller. This video controller processes a drawing instruction from the CPU 11, writes processed drawing information into a video memory, and reads this drawing information from the video memory and outputs it to the main display unit 14 as drawing data (display data).

The display unit 14 is, for example, a liquid crystal display to display a display screen based on the drawing data (display data) output from the video subsystem 13. As illustrated in FIG. 1 and FIG. 2, the display unit 14 is arranged on the first chassis 101 in a manner to make the display surface F1 visible.

The chipset 21 includes controllers, such as USB (Universal Serial Bus), serial ATA (AT Attachment), an SPI (Serial Peripheral Interface) bus, a PCI (Peripheral Component Interconnect) bus, a PCI-Express bus, and an LPC (Low Pin Count) bus, and plural devices are connected to the chipset 21. In FIG. 3, the BIOS memory 22, the HDD 23, the audio system 24, the WLAN card 25, the USB connector 26, and the camera 27 are connected to the chipset 21 as examples of the devices.

For example, the BIOS (Basic Input Output System) memory 22 is configured by an electrically rewritable nonvolatile memory such as an EEPROM (Electrically Erasable Programmable Read Only Memory) or a flash ROM. The BIOS memory 22 stores the BIOS and system firmware for controlling the embedded controller 31 and the like.

The HDD (Hard Disk Drive) 23 (an example of a non-volatile storage device) stores the OS, various drivers, various services/utilities, application programs, and various data.

A microphone 241 and a speaker 242 are connected to the audio system 24 which records, plays back, and outputs sound data. It is assumed as an example that the microphone 241 and the speaker 242 are incorporated in the laptop PC 1.

The WLAN (Wireless Local Area Network) card 25 is connected to a network by wireless LAN to perform data communication. When receiving data from the network, for example, the WLAN card 25 generates an event trigger indicating that data are received.

The USB connector 26 is a connector for connecting peripheral devices using the USB.

The camera 27 (an example of an imaging unit) is, for example, a ToF camera (Time-of-Flight Camera) to capture images. As illustrated in FIG. 1 and FIG. 2, the camera 27 is placed in an upper part of the display unit 14 in the laptop mode and in a lower part of the display unit 14 in the tent mode. The camera 27 is connected to the chipset 21 through the USB interface. The camera 27 is used to detect a user to be described later.

The embedded controller 31 is a one-chip microcomputer which monitors and controls various devices (peripheral devices, sensors, and the like) irrespective of the system state of the laptop PC 1. Further, the embedded controller 31 has a power management function to control the power supply circuit 33. Note that the embedded controller 31 is composed of a CPU, a ROM, a RAM, and the like, which are not illustrated, and equipped with multi-channel A/D input terminal and D/A output terminal, a timer, and a digital input/output terminal. To the embedded controller 31, for example, the input unit 32, the power supply circuit 33, the Hall sensor 35, the proximity sensor 36, the acceleration sensor 37, and the like are connected through these input/output terminals, and the embedded controller 31 controls the operation of these units.

The embedded controller 31 controls the power supply circuit 33 according to the system states (for example, S0 state to S5 state) defined in the ACPI (Advanced Configuration and Power Interface) specification. Here, the S0 state is the most active state, which is a normal working state (normal operating state). Further, the S5 state is a shutdown state (power-off state) in which the power supply is turned off by software.

For example, the input unit 32 includes an input device such as the keyboard and a pointing device such as a touch pad. As illustrated in FIG. 1, the input unit 32 is arranged on the surface F2 of the second chassis 102.

The power supply circuit 33 includes, for example, a DC/DC converter, a charge/discharge unit, an AC/DC adapter, and the like to convert DC voltage supplied from an external power supply or the battery 34 into plural voltages required to operate the laptop PC 1. Further, the power supply circuit 33 supplies power to each unit of the laptop PC 1 under the control of the embedded controller 31.

The battery 34 is, for example, a lithium battery, which is charged through the power supply circuit 33 when power is supplied from the external power supply to the laptop PC 1, and outputs the charged power as the operating power of the laptop PC 1 through the power supply circuit 33 when power is not supplied from the external power supply to the laptop PC 1.

The Hall sensor 35 is arranged, for example, inside the second chassis 102 to detect an ambient magnetic field. Note that a permanent magnet (not illustrated) is placed in the first chassis 101 at a position facing the Hall sensor 35 inside the second chassis 102 in a state where the first chassis 101 is closed, and the Hall sensor 35 is used in processing for detecting the strength of the magnetic field of the permanent magnet to identify whether the opening angle θ is 0 degrees or 360 degrees.

The proximity sensor 36 is, for example, a capacitive sensor to detect the approach of an object.

The acceleration sensor 37 is, for example, a 3-axis acceleration sensor to detect acceleration. Note that the laptop PC 1 includes two acceleration sensors 37 (37A, 37B), and the detection results of the two acceleration sensors 37 (37A, 37B) are used to detect the opening angle θ. The acceleration sensor 37A is arranged, for example, inside the first chassis 101, and the acceleration sensor 37B is arranged, for example, inside the second chassis 102.

Figure 4:
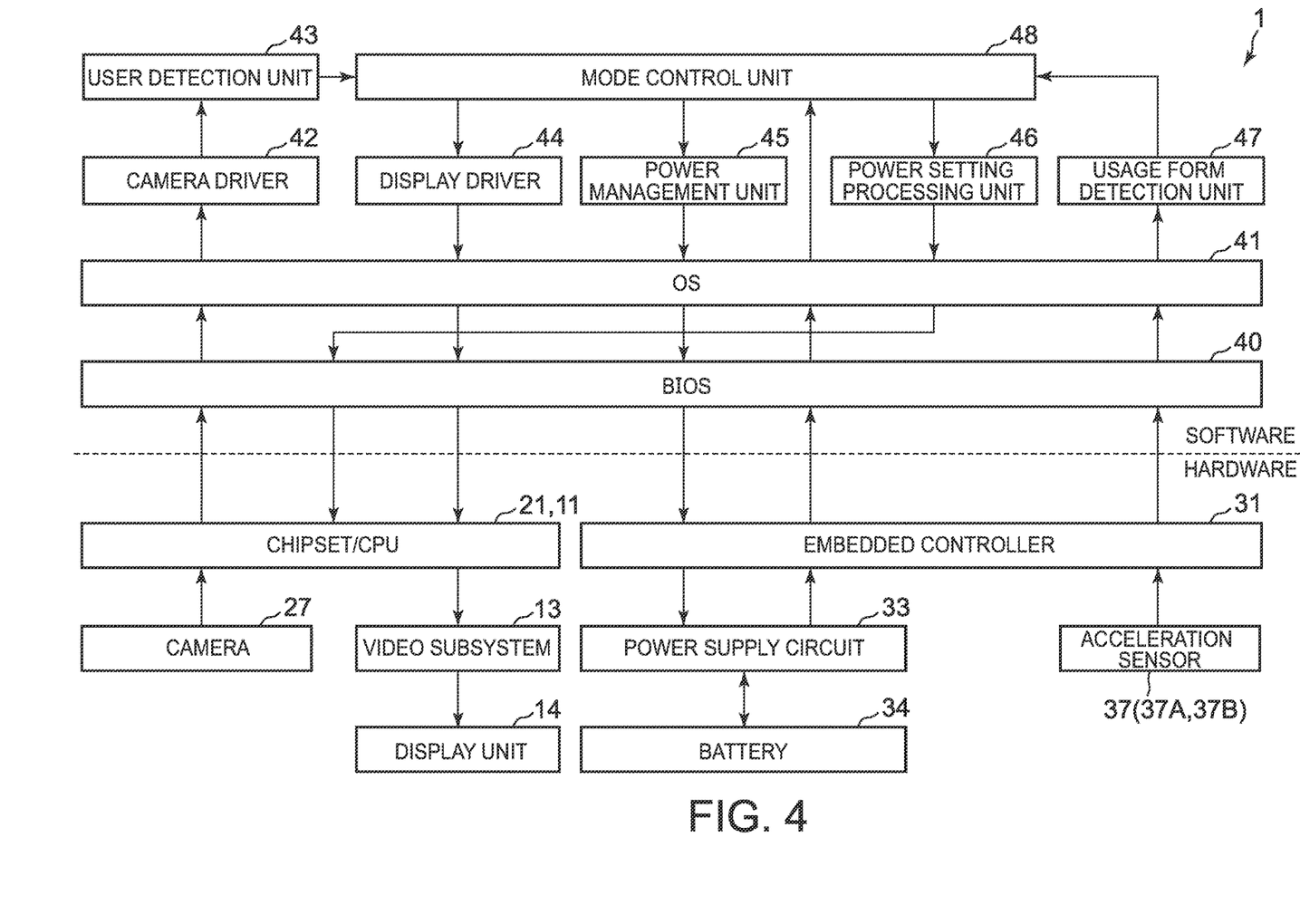
FIG. 4 is a block diagram illustrating an example of the functional configuration of the laptop PC according to the embodiment.

Referring next to FIG. 4, the functional configuration of the laptop PC 1 according to the embodiment will be described.

FIG. 4 is a block diagram illustrating the functional configuration of the laptop PC 1 according to the embodiment.

As illustrated in FIG. 4, the laptop PC 1 includes, as components implemented by software, a BIOS 40, an OS 41, a camera driver 42, a user detection unit 43, a display driver 44, a power management unit 45, a power setting processing unit 46, a usage form detection unit 47, and a mode control unit 48. Further, the laptop PC 1 includes, as main hardware components of the embodiment, the chipset (21)/CPU (11), the video subsystem 13, the display unit 14, the camera 27, the embedded controller 31, the power supply circuit 33, the battery 34, and the acceleration sensor 37 (37A, 37B).

Note that the BIOS 40, the OS 41, the camera driver 42, the user detection unit 43, the display driver 44, the power management unit 45, the power setting processing unit 46, the usage form detection unit 47, and the mode control unit 48 are implemented by the CPU 11 reading programs stored in the HDD 23 or the BIOS memory 22 into the main memory 12 and executing the programs.

The OS 41 is an operating system such as Windows (registered trademark) to input/output information to/from various hardware components through the BIOS 40.

Further, the camera driver 42, the user detection unit 43, the display driver 44, the power management unit 45, the power setting processing unit 46, the usage form detection unit 47, and the mode control unit 48 are device drivers and some of applications executed based on the OS 41.

The camera driver 42 acquires image data captured with the camera 27 through the BIOS 40 and the OS 41, and outputs the acquired image data to the user detection unit 43. Since the orientation of the camera 27 are turned upside down between the laptop mode and the tent mode described above, the camera driver 42 outputs, to the user detection unit 43, image data after being subjected to processing for turning the image data upside down according to the usage form (the orientation of the camera 27).

Based on the image data (captured image) captured with the camera 27 and acquired by the camera driver 42, the user detection unit 43 detects whether a user is present within a predetermined detection range or not. The user detection unit 43 detects whether the user is present within the predetermined detection range depending on whether the user is included in a predetermined range of the captured image. The user detection unit 43 may detect whether the user is present or not by a combination of image data (captured image) captured with the camera 27 and the detection result of the proximity sensor 36. The user detection unit 43 outputs, to the mode control unit 48, the detection result of whether the user is present or not.

The display driver 44 controls the video subsystem 13 and the display unit 14. For example, when the display of the display unit 14 is suspended or the display is resumed, the display driver 44 controls the video subsystem 13 and the display unit 14 to suspend or resume the display of the display unit 14.

The power management unit 45 is, for example, an ACPI driver to manage the power consumption of the system of the laptop PC 1 according to the system state. For example, the power management unit 45 controls the power supply circuit 33 through the embedded controller 31 according to the system state to control the supply of power to each unit. Further, for example, when the system state is put into a hibernation state (S4 state), the power management unit 45 performs control to save, to a storage unit (for example, the HDD 23), the state before the system is halted, and shut down the supply of power to the CPU 11 and the like. Further, for example, upon returning from the hibernation state (S4 state), the power management unit 45 uses the information saved to the storage unit (for example, the HDD 23) to perform control to return to the state before the system is halted.

Further, when an event to make a transition to a sleeping state such as a sleep state (S3 state) occurs, the power management unit 45 keeps setting information as to whether to permit the transition to the sleeping state such as the sleep state (S3 state) or not. Upon occurrence of the event to make the transition to the sleeping state, when the setting information indicates a setting to permit the transition, the power management unit 45 executes processing for making the transition to the sleeping state, while when the setting information indicates a setting to prohibit the transition, the power management unit 45 does not execute the processing for making the transition to the sleeping state.

The power setting processing unit 46 is, for example, a DPTF (Dynamic Platform and Thermal Framework) driver to set the maximum power consumption of the CPU 11 and the chipset 21. The power setting processing unit 46 has a state table as a maximum power consumption table, and an action table indicative of the content of setting processing for the CPU 11 and the chipset 21. Based on the state table and the action table, the power setting processing unit 46 executes the setting processing corresponding to the maximum power consumption.

For example, based on an instruction from the mode control unit 48, the power setting processing unit 46 changes the setting of the maximum power consumption of the CPU 11 and the chipset 21.

For example, the usage form detection unit 47 detects the opening angle θ based on the detection result of the acceleration sensor 37 (37A, 37B) to detect a usage form (for example, a use mode such as the tent mode) based on the detected opening angle θ. For example, when the opening angle θ is 0 degrees, the usage form detection unit 47 determines that the laptop PC 1 is in the closed mode, while when the opening angle θ is 360 degrees, the usage form detection unit 47 determines that the laptop PC 1 is in the tablet mode. Further, when the opening angle θ is larger than 0 degrees and smaller than 190 degrees (0 degrees<θ<190 degrees), the usage form detection unit 47 determines that the laptop PC 1 is in the laptop mode. Further, for example, when the opening angle θ is larger than or equal to 190 degrees and smaller than 360 degrees 190 degrees≤θ<360 degrees), the usage form detection unit 47 determines that the laptop PC 1 is in the tent mode.

Thus, the usage form detection unit 47 detects, for example, the tent mode based on the opening angle θ. The usage form detection unit 47 outputs the detection result (determination result) of the usage form to the mode control unit 48.

Note that the usage form detection unit 47 may detect that the opening angle θ is 0 degrees or 360 degrees by a combination of the detection result of the acceleration sensor 37 (37A, 37B) and the detection result of the Hall sensor 35.

The mode control unit 48 is, for example, part of an application for implementing the functions of the smart speaker having the display function. When the usage form detection unit 47 detects the tent mode, the mode control unit 48 disables the permission of the transition to the sleeping state in which at least part of the system processing is stopped, and enables a voice input function from the normal processing mode to change to a voice input processing mode in which the processing state of the system is maintained.

Here, the sleeping state includes, for example, the sleep state (S3 state) and the hibernation state (S4 state), and the mode control unit 48 changes the setting information of the power management unit 45 to a setting to prohibit the transition in order to disable the permission of the transition. Thus, the laptop PC 1 maintains the processing state (S0 state) of the system in the tent mode.

The normal processing mode is, for example, a processing mode in which the laptop PC 1 is normally processed as a personal computer or a tablet terminal in the laptop mode or the tablet mode. Further, the voice input processing mode is, for example, an operating mode functioning as a smart speaker, in which various inputs by user's voice from the microphone 241 and output from the speaker 242 are enabled.

When the tent mode is detected, the mode control unit 48 causes the audio system 24 to enable voice input from the microphone 241 in a manner to be put into a state where voice input by the user is enabled, and to change to the voice input processing mode.

Further, in the embodiment, the voice input processing mode includes the show mode as a function of the smart speaker having the display function, and the mode control unit 48 displays various kinds of information (for example, images) on the display unit 14 through the display driver 44 in the voice input processing mode.

Further, in the voice input processing mode, when the user detection unit 43 detects the presence of the user within the predetermined detection range, the mode control unit 48 provides a display of the display unit 14, while when the user detection unit 43 detects the absence of the user within the predetermined detection range, the mode control unit 48 suspends the display of the display unit 14. When suspending the display of the display unit 14, the mode control unit 48 stops the operation of the video subsystem 13 and the display unit 14 through the display driver 44.

Further, in the voice input processing mode, the mode control unit 48 controls the power setting processing unit 46 to change the setting of the maximum power consumption to a setting lower than the setting in the normal processing mode (for example, to the setting of the minimum power consumption). In other words, in the voice input processing mode, the power setting processing unit 46 changes the setting of the maximum power consumption to a setting lower than the setting in the normal processing mode under the control of the mode control unit 48.

Note that the mode control unit 48 may perform control to change the setting of the maximum power consumption to a setting lower than the setting in the normal processing mode when the laptop PC 1 is in the voice input processing mode and operated by power supplied from the battery 34. In other words, in this case, the power setting processing unit 46 changes the setting of the maximum power consumption to a setting lower than the setting in the normal processing mode when the laptop PC 1 is in the voice input processing mode and operated by power supplied from the battery 34.

In a state where the laptop PC 1 is in the voice input processing mode and operated by power supplied from the battery 34 (in a battery-operated voice input processing mode), when the remaining power of the battery 34 becomes low, the mode control unit 48 changes the system to the hibernation state. For example, in the battery-operated voice input processing mode, when the remaining power of the battery 34 becomes a predetermined remaining power capable of executing processing in the normal processing mode or lower, the mode control unit 48 cancels the voice input processing mode and changes to the hibernation state (S4 state).

Here, the hibernation state (S4 state) is a state where the state before the system is halted is saved to a storage unit (for example, the HDD) and the supply of power is shut down. Upon changing to the hibernation state (S4 state), the mode control unit 48 shuts down the supply of power from the power supply circuit 33 through the power management unit 45.

The predetermined remaining power capable of executing processing in the normal processing mode is electric energy, for example, in a range of 25% to 40% of the maximum charging power of the battery 34. In the embodiment, as an example, the predetermined remaining power will be described below as an electric energy of 30% of the maximum charging power.

When there is an application(s) being executed upon changing to the voice input processing mode, the mode control unit 48 changes from the normal processing mode to the voice input processing mode after suspending the application(s) being executed before the change. Further, upon changing from the voice input processing mode to the normal processing mode, the mode control unit 48 resumes the execution of the application(s) being executed before the change to the voice input processing mode.

Further, when a release of the tent mode is detected based on the opening angle, the mode control unit 48 returns to the normal processing mode before the change to the voice input processing mode. In other words, when the usage form detection unit 47 detects that the tent mode is released, the mode control unit 48 controls the power setting processing unit 46 to return the setting of the maximum power consumption of the CPU 11 and the chipset 21 to the setting before the change to the voice input processing mode, and returns to the normal processing mode before the change. Thus, upon returning to the normal processing mode before the change, the power setting processing unit 46 changes the setting of the maximum power consumption to the setting before the change to the voice input processing mode under the control of the mode control unit 48.

Next, the operation of the laptop PC 1 according to the embodiment will be described with reference to the drawings.

Figure 5:
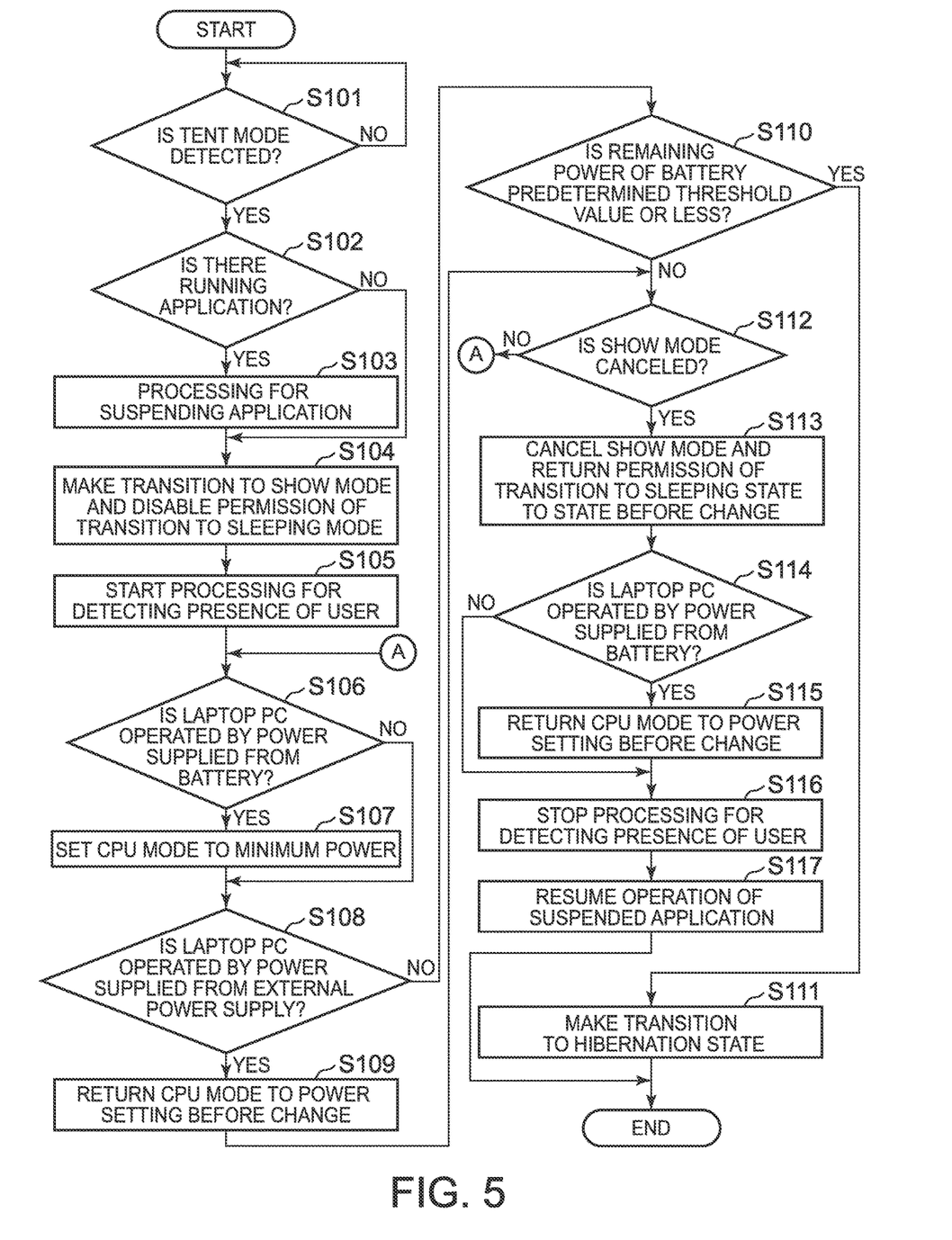
FIG. 5 is a flowchart illustrating an example of the operation of the laptop PC according to the embodiment.

FIG. 5 is a flowchart illustrating an example of the operation of the laptop PC 1 according to the embodiment. In the example illustrated in FIG. 5, processing for making a transition from the normal processing mode of the laptop PC 1 such as the laptop mode to the show mode by the user changing the usage form to the tent mode, and processing for returning from the show mode to the normal processing mode will be described.

As illustrated in FIG. 5, the mode control unit 48 of the laptop PC 1 determines whether the tent mode is detected or not (step S101). For example, based on the detection result of the acceleration sensor 37 (37A, 37B), the usage form detection unit 47 of the laptop PC 1 detects the opening angle θ and detects the tent mode as the usage form based on the detected opening angle θ. For example, when the opening angle θ is larger than or equal to 190 degrees and smaller than 360 degrees (190 degrees≤θ<360 degrees), the usage form detection unit 47 detects that the laptop PC 1 is in the tent mode. The mode control unit 48 acquires the detection result of the usage form detection unit 47 to determine whether the usage form detection unit 47 detects the tent mode or not.

When the tent mode as illustrated in FIG. 2 is detected (step S101: YES), the mode control unit 48 causes the processing to proceed to step S102. On the other hand, when the tent mode is not detected (step S101: NO), the mode control unit 48 causes the processing to return to step S101 and repeat the processing for determining the detection of the tent mode.

In step S102, the mode control unit 48 determines whether there is a running application or not. For example, the mode control unit 48 checks a process manager of the OS 41 or the like to determine whether there is a running application or not. When there is a running application (step S102: YES), the mode control unit 48 causes the processing to proceed to step S103. On the other hand, when there is no running application (step S102: NO), the mode control unit 48 causes the processing to proceed to step S104.

In step S103, the mode control unit 48 executes processing for suspending the running application. For example, the mode control unit 48 suspends the running application and stores, for example, in the main memory 12, information indicative of the running application.

Next, in step S104, the mode control unit 48 makes a transition to the show mode, and disables the permission of transition to the sleeping state. The mode control unit 48 causes the audio system 24 to enable voice input through the microphone 241 and to be put into a state where voice input by the user is enabled, and displays various kinds of information (for example, images) on the display unit 14 through the display driver 44. Thus, the mode control unit 48 makes a transition from the normal processing mode to the voice input processing mode with the display function.

Further, the mode control unit 48 changes the setting information of the power management unit 45 to a setting to prohibit the transition to disable the permission of the transition in order to maintain the processing state of the system. Note that the mode control unit 48 stores, for example, in the main memory 12, the setting information of the power management unit 45 before the change.

Next, the user detection unit 43 of the laptop PC 1 starts processing for detecting the presence of the user (step S105). For example, based on image data (captured image) captured with the camera 27 and acquired by the camera driver 42, the user detection unit 43 starts processing for periodically detecting whether the user is present within the predetermined detection range or not. The details of the processing for detecting the presence of the user will be described later.

Next, the mode control unit 48 determines whether the laptop PC 1 is operated by power supplied from the battery 34 or not (step S106). The mode control unit 48 acquires information as to whether power is supplied from the external power supply to the power supply circuit 33 or not, for example, through the embedded controller 31, the BIOS 40, and the OS 41, and determines whether the laptop PC 1 is operated by power supplied from the battery 34 or not. When the laptop PC 1 is operated by power supplied from the battery 34 (step S106: YES), the mode control unit 48 causes the processing to proceed to step S107. On the other hand, when the laptop PC 1 is not operated by power supplied from the battery 34 (i.e., when the laptop PC 1 is operated by power supplied from the external power supply) (step S106: NO), the mode control unit 48 causes the processing to proceed to step S108.

In step S107, the mode control unit 48 sets the CPU mode to the minimum power. In other words, the mode control unit 48 controls the power setting processing unit 46 to change the setting of the maximum power consumption (CPU mode), for example, to the setting of the minimum power consumption. Thus, the power setting processing unit 46 changes the setting of the maximum power consumption to the setting of the minimum power consumption lower than the setting in the normal processing mode under the control of the mode control unit 48. Further, the mode control unit 48 stores, for example, in the main memory 12, the setting information on the maximum power consumption before the change.

In step S107, when the setting of the maximum power consumption (CPU mode) is already changed to the setting of the minimum power consumption, the mode control unit 48 maintains the current state without executing the processing in step S107.

Next, in step S108, the mode control unit 48 determines whether the laptop PC 1 is operated by power supplied from the external power supply or not. The mode control unit 48 acquires information as to whether power is supplied from the external power supply to the power supply circuit 33 or not, for example, through the embedded controller 31, the BIOS 40, and the OS 41, and determines whether the laptop PC 1 is operated by power supplied from the external power supply or not. When the laptop PC 1 is operated by power supplied from the external power supply (step S108: YES), the mode control unit 48 causes the processing to proceed to step S109. On the other hand, when power is not supplied from the external power supply to the power supply circuit 33 (i.e., when the laptop PC 1 is operated by power supplied from the battery 34) (step S108: NO), the mode control unit 48 causes the processing to proceed to step S110.

In step S109, the mode control unit 48 returns to the setting before the CPU mode is changed. In other words, the mode control unit 48 acquires the setting information on the maximum power consumption before the setting change stored in the main memory 12, and controls the power setting processing unit 46 to change the setting of the maximum power consumption to the acquired setting of the maximum power consumption before the change. Thus, the power setting processing unit 46 returns the setting of the maximum power consumption to the state before the setting change under the control of the mode control unit 48. After the processing in step S109, the mode control unit 48 causes the processing to proceed to step S112.

In step S109, when the setting of the maximum power consumption (CPU mode) is already returned to the state before the setting change, the mode control unit 48 maintains the current state without executing the processing in step S109, and causes the processing to proceed to step S112.

In step S110, the mode control unit 48 determines whether the remaining power of the battery 34 is a predetermined threshold value or less (for example, 30% or less). The mode control unit 48 acquires information on the remaining power of the battery 34, for example, through the embedded controller 31, the BIOS 40, and the OS 41, and determines whether the acquired remaining power information is information indicative of 30% or less of the full charge of the battery 34 or not. When the remaining power of the battery 34 is 30% or less (step S110: YES), the mode control unit 48 causes the processing to proceed to step S111. On the other hand, when the remaining power of the battery 34 is more than 30% (step S110: NO), the mode control unit 48 causes the processing to proceed to step S112.

In step S111, the mode control unit 48 causes the system to make a transition to the hibernation state. The mode control unit 48 causes the system state to make the transition to the hibernation state (S4 state), for example, through the power management unit 45. Upon transition to the hibernation state (S4 state), the power management unit 45 performs control to save, to the storage unit (for example, the HDD 23), the state before the system is halted, and shut down the power supply to the CPU 11 and the like. After the processing in step S111, the mode control unit 48 ends the processing.

Further, in step S112, the mode control unit 48 determines whether to cancel the show mode or not. For example, when a special operation of the input unit 32 to cancel the show mode or the release of the tent mode is detected, the mode control unit 48 determines to cancel the show mode. When the release of the tent mode is detected, the usage form detection unit 47 detects that the usage form is changed, for example, to the laptop mode or the tablet mode based on the opening angle θ, and the mode control unit 48 detects the release of the tent mode.

When the show mode is canceled (step S112: YES), the mode control unit 48 causes the processing to proceed to step S113. On the other hand, when the show mode is not canceled (step S112: NO), the mode control unit 48 causes the processing to return to step S106 and continue the show mode.

In step S113, the mode control unit 48 cancels the show mode and returns the permission of transition to the sleeping state to the state before the change. For example, the mode control unit 48 causes the audio system 24 to disable voice input through the microphone 241 in a manner to be put into a state where voice input by the user is disabled, and to suspend the display of various kinds of information (for example, images) in the show mode on the display unit 14 through the display driver 44. Further, the mode control unit 48 acquires the setting information of the power management unit 45 before the change stored in the main memory 12, and changes the setting information of the power management unit 45 to the acquired setting information before the change to return the permission of the transition to the sleeping state to the state before the change.

Next, the mode control unit 48 determines whether the laptop PC 1 is operated by power supplied from the battery 34 or not (step S114). The mode control unit 48 acquires information as to whether power is supplied from the external power supply to the power supply circuit 33 or not, for example, through the embedded controller 31, the BIOS 40, and the OS 41, and determines whether the laptop PC 1 is operated by power supplied from the battery 34 or not. When the laptop PC 1 is operated by power supplied from the battery 34 (step S114: YES), the mode control unit 48 causes the processing to proceed to step S115. On the other hand, when the laptop PC 1 is not operated by power supplied from the battery 34 (i.e., when the laptop PC 1 is operated by power supplied from the external power supply) (step S114: NO), the mode control unit 48 causes the processing to proceed to step S116.

In step S115, the mode control unit 48 returns the CPU mode to the setting before the change. In other words, the mode control unit 48 acquires the setting information on the maximum power consumption before the change stored in the main memory 12, and controls the power setting processing unit 46 to change the setting of the maximum power consumption to the acquired setting of the maximum power consumption before the change. Thus, the power setting processing unit 46 returns the setting of the maximum power consumption to the state before the change under the control of the mode control unit 48.

Next, in step S116, the user detection unit 43 stops the processing for detecting the presence of the user. The user detection unit 43 stops the processing for periodically detecting whether the user is present within the predetermined detection range or not.

Next, the mode control unit 48 resumes the suspended application (step S117). For example, the mode control unit 48 acquires information indicative of the application stored in the main memory 12, and resumes the operation of the application corresponding to the acquired information indicative of the application. After the processing in step S117, the mode control unit 48 ends the processing.

Thus, the laptop PC 1 according to the embodiment is put into the tent mode to make a transition from the normal processing mode to the show mode corresponding to the function of the smart speaker having the display function. Then, the show mode is canceled with the special operation of the input unit 32 to cancel the show mode or by releasing the tent mode to return to the normal processing mode.

Figure 6:
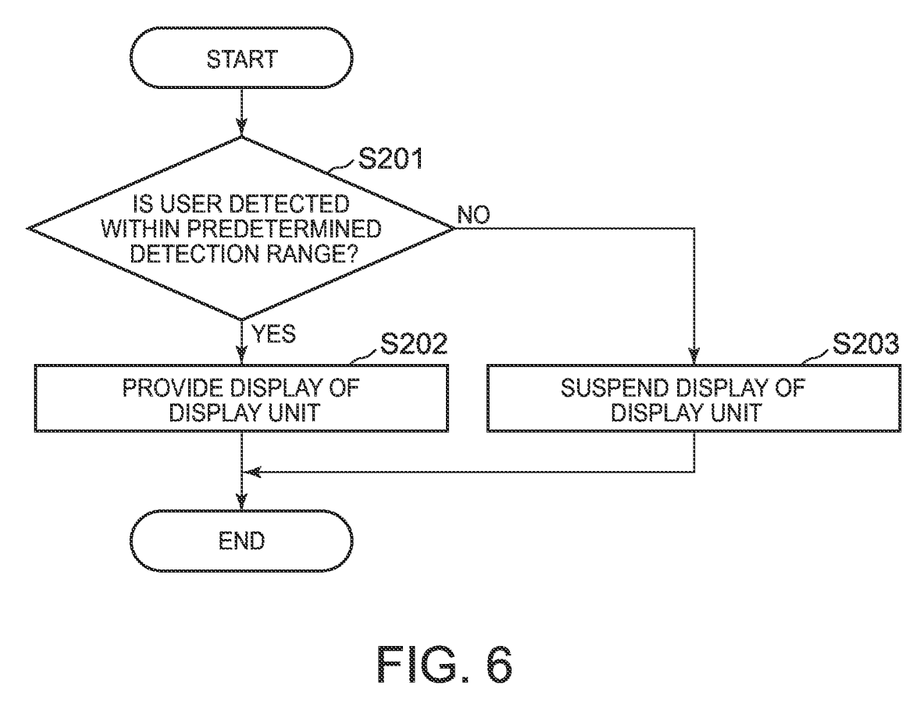
FIG. 6 is a flowchart illustrating an example of user detection processing of the laptop PC according to the embodiment.

Referring next to FIG. 6, the details of user detection processing of the laptop PC 1 according to the embodiment will be described.

FIG. 6 is a flowchart illustrating an example of user detection processing of the laptop PC 1 according to the embodiment.

As illustrated in FIG. 6, in the user detection processing, the user detection unit 43 of the laptop PC 1 first determines whether the user is detected within the predetermined detection range or not (step S201). Based on the image data (captured image) captured with the camera 27 and acquired by the camera driver 42, the user detection unit 43 detects whether the user is present within the predetermined detection range or not. When the user is detected within the predetermined detection range (step S201: YES), the user detection unit 43 causes the processing to proceed to step S202. On the other hand, when the user cannot be detected within the predetermined detection range (step S201: NO), the user detection unit 43 causes the processing to proceed to step S203.

In step S202, the mode control unit 48 provides a display of the display unit 14. For example, the mode control unit 48 displays various kinds of information (for example, images) in the show mode on the display unit 14 through the display driver 44. When the display of the display unit 14 is already provided, the mode control unit 48 maintains the state of providing the display of the display unit 14.

Further, in step S203, the mode control unit 48 suspends the display of the display unit 14. For example, the mode control unit 48 suspends the display of the display unit 14, on which various kinds of information (for example, images) in the show mode are displayed, for example, through the display driver 44. When the display of the display unit 14 is already suspended, the mode control unit 48 maintains the state where the display of the display unit 14 is suspended.

Thus, in the user detection processing according to the embodiment, when the user is present within the predetermined detection range, the laptop PC 1 maintains the display of the display unit 14 as the show mode. Further, when the user has left around the laptop PC 1 and the user is no longer present within the predetermined detection range, the laptop PC 1 suspends the display of the display unit 14 to reduce power consumption.

Note that the user detection processing illustrated in FIG. 6 is periodically executed from step S105 to step S116 in FIG. 5 described above.

Figure 7:
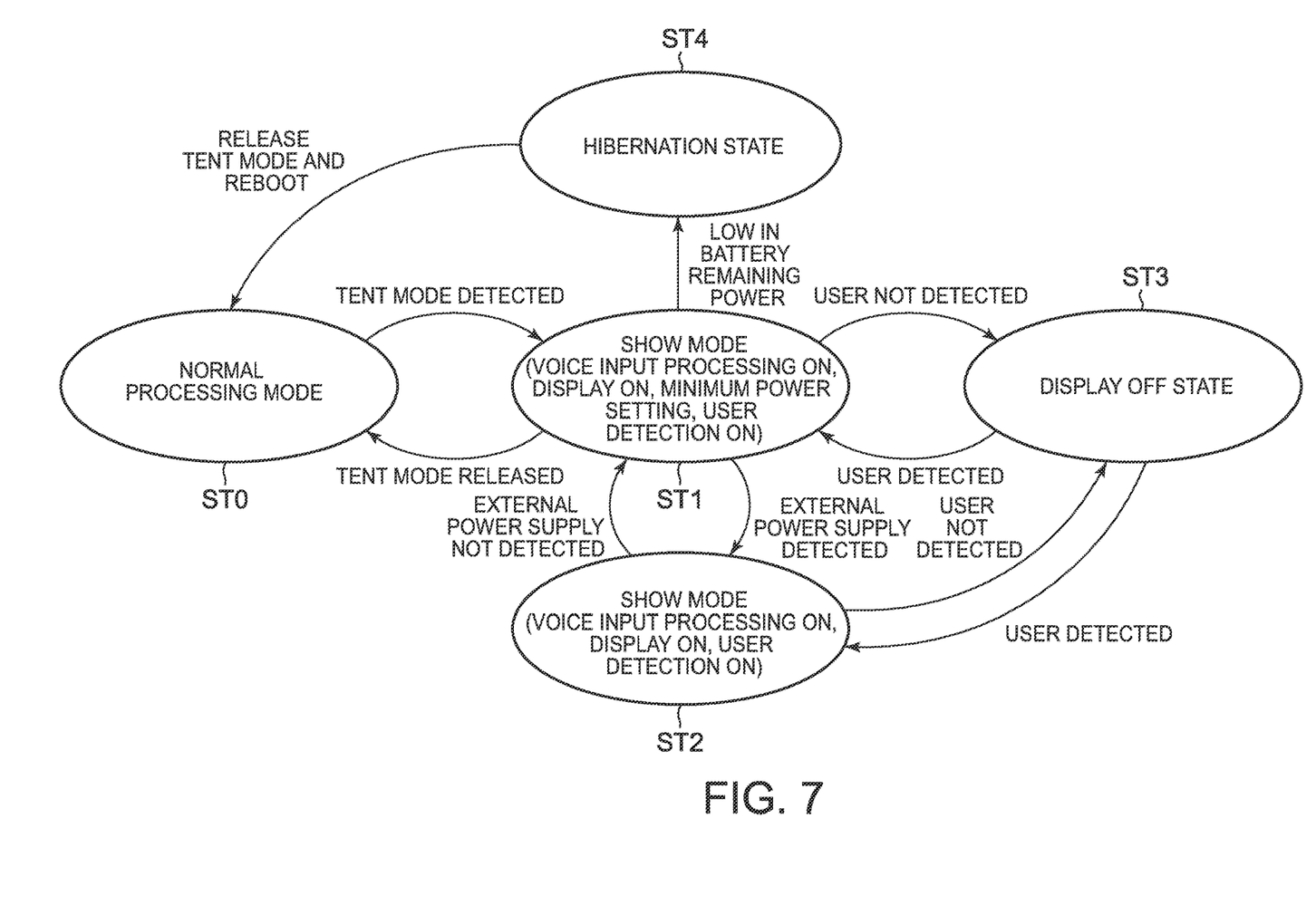
FIG. 7 is a state transition diagram illustrating an example of the operation of the laptop PC according to the embodiment.

Referring next to FIG. 7, state transitions related to the show mode of the laptop PC 1 according to the embodiment will be described.

FIG. 7 is a state transition diagram illustrating an example of the operation of the laptop PC 1 according to the embodiment.

In state ST0 illustrated in FIG. 7, the laptop PC 1 is in the normal processing mode such as the laptop mode or the tablet mode. In state ST0, it is assumed that the laptop PC 1 is executing normal information processing of various applications and the like, and the CPU mode (the setting of the maximum power consumption) is set high depending on the processing being executed. It is also assumed that the laptop PC 1 is operated by power supplied from the battery 34.

In state ST0, when the first chassis 101 and the second chassis 102 are folded back by the user through the hinge mechanism 103 and put into the tent mode as illustrated in FIG. 2, the laptop PC 1 makes a transition from state ST0 (normal processing mode) to state ST1 (show mode). In other words, when the usage form detection unit 47 detects the tent mode, the mode control unit 48 of the laptop PC 1 makes the transition from state ST0 (normal processing mode) to state ST1 (show mode).

In state ST1, the laptop PC 1 is in the show mode, in which voice input processing through the microphone 241 is on, the display of the display unit 14 is on, the setting of the maximum power consumption is the setting of the minimum power consumption, the user detection processing is on, and the transition to the sleep mode is off. In state ST1, it is assumed that the user is present within the predetermined detection range (the user is present around the laptop PC 1) in the user detection processing.

In state ST1, when power is supplied from the external power supply through the AC adapter or the like, the laptop PC 1 makes a transition to state ST2 to return the CPU mode (the setting of the maximum power consumption) from the setting of the minimum power consumption to the setting of the maximum power consumption in the state (state ST0) before the change. The mode control unit 48 acquires the setting information on the maximum power consumption before the setting change stored in the main memory 12, and controls the power setting processing unit 46 to change the setting of the maximum power consumption to the acquired setting of the maximum power consumption before the change.

Further, in state ST2, when the supply of power from the external power supply through the AC adapter or the like is no longer detected (when the state is returned to the state of being operated by power from the battery 34), the laptop PC 1 (mode control unit 48) changes the CPU mode (the setting of the maximum power consumption) to the setting of the minimum power consumption, and returns to state ST1.

Further, in state ST1, when the absence of the user within the predetermined detection range is detected, the laptop PC 1 makes a transition to state ST3 to suspend the display of the display unit 14. In other words, when the absence of the user is detected by the user detection unit 43, the mode control unit 48 suspends the display of the display unit 14, on which various kinds of information (for example, images) in the show mode are displayed, for example, through the display driver 44.

Note that processing when the absence of the user within the predetermined detection range is detected in state ST2 is the same as the processing in state ST1.

Further, in state ST3, when the presence of the user within the predetermined detection range is detected, the laptop PC 1 returns to state ST1 (show mode). In other words, when the presence of the user is detected by the user detection unit 43, the mode control unit 48 resumes the display of the display unit 14, on which various kinds of information (for example, images) in the show mode are displayed, for example, through the display driver 44.

In the case of the transition from state ST2 to state ST3, when the presence of the user is detected by the user detection unit 43, the mode control unit 48 executes the same processing to transition from state ST3 to state ST2.

Further, in state ST1, when the release of the tent mode is detected, the laptop PC 1 returns to state ST0 to make a transition to the normal processing mode. In other words, when the tent mode is no longer detected by the usage form detection unit 47, the mode control unit 48 makes a transition from state ST1 (show mode) to state ST0 (normal processing mode).

Further, in state ST1, when the remaining power of the battery 34 becomes low (for example, becomes 30% or less), the laptop PC 1 makes a transition from state ST1 (show mode) to state ST4 (hibernation state). For example, the mode control unit 48 causes the system state to make a transition to the hibernation state (S4 state) through the power management unit 45.

Further, in state ST4, when the tent mode is released and the laptop PC 1 is rebooted, the laptop PC 1 returns to state ST0 to be booted in the normal processing mode. In this case, although the remaining power of the battery 34 is 30% or less, the remaining power is enough to be able to perform processing in the normal processing mode. Therefore, the laptop PC 1 executes processing in the normal processing mode (for example, processing of the application(s) that was/were being executed).

As described above, the laptop PC 1 (information processing apparatus) according to the embodiment includes the first chassis 101, the second chassis 102, the hinge mechanism 103 (rotation mechanism), the mode control unit 48, and the power setting processing unit 46. The first chassis 101 has at least the display unit 14. The second chassis 102 has at least the input unit 32. The hinge mechanism 103 (rotation mechanism) makes the first chassis 101 rotatable with respect to the second chassis 102 while coupling the first chassis 101 and the second chassis 102. When the tent mode is detected, the mode control unit 48 disables the permission of transition to the sleeping state in which at least part of the system processing is stopped when the display of the display unit 14 is suspended, and enables the voice input function from the normal processing mode to change to the voice input processing mode (for example, show mode) in which the processing state (for example, S0 state) of the system is maintained. Here, the tent mode is a state where the first chassis 101 and the second chassis 102 are folded back through the hinge mechanism 103 with the display surface of the display unit 14 and the input unit 32 on the outside. In the voice input processing mode, the power setting processing unit 46 changes the setting of the maximum power consumption to a setting lower than the setting in the normal processing mode (for example, to the setting of the minimum power consumption).

Thus, in the voice input processing mode (for example, show mode), since the laptop PC 1 according to the embodiment changes the setting of the maximum power consumption to a setting lower than the setting in the normal processing mode (for example, to the setting of the minimum power consumption), power consumption in the voice input processing mode can be reduced. Therefore, for example, when the laptop PC 1 according to the embodiment is operated by the battery 34, the available time (operating time) in the voice input processing mode can be lengthened, and hence convenience can be improved.

Further, the laptop PC 1 according to the embodiment includes the user detection unit 43 which detects whether the user is present within the predetermined detection range or not. In the voice input processing mode, when the user detection unit 43 detects that the user is present within the predetermined detection range, the mode control unit 48 provides the display of the display unit 14, while when the user detection unit 43 detects that the user is not present within the predetermined detection range, the mode control unit 48 suspends the display of the display unit 14.

Thus, since the laptop PC 1 according to the embodiment stops the display unit 14, for example, when the user is not present within the predetermined detection range, power consumption can be further reduced. Therefore, for example, when the laptop PC 1 according to the embodiment is operated by the battery, the available time (operating time) in the voice input processing mode can be further lengthened.

Further, in the embodiment, upon changing to the voice input processing mode, the mode control unit 48 suspends the application(s) being executed before the change, and resumes the execution of the application(s) being executed before the change upon changing from the voice input processing mode to the normal processing mode.

Thus, the laptop PC 1 according to the embodiment can easily enter the voice input processing mode by entering the tent mode, and can easily resume processing by the previous application(s) when the voice input processing mode is canceled. Therefore, the laptop PC 1 according to the embodiment can further improve convenience.

Further, in the embodiment, when the laptop PC 1 is in the voice input processing mode and operated by power supplied from the battery 34, the power setting processing unit 46 changes the setting of the maximum power consumption to a setting lower than that in the normal processing mode.

Thus, when the laptop PC 1 according to the embodiment is operated by the battery in the voice input processing mode (show mode), power consumption can be reduced, and hence the available time (operating time) can be lengthened.

Further, in the embodiment, in the state where the laptop PC 1 is in the voice input processing mode and operated by power supplied from the battery, when the remaining power of the battery 34 becomes less than or equal to the predetermined remaining power, the mode control unit 48 cancels the voice input processing mode, and changes to the hibernation state in which the state of the system before halted is saved to the storage unit and power supply is shut down. Here, the predetermined remaining power is a value at which processing in the normal processing mode is executable (for example, remaining power of 25% to 40% of the fully charged power of the battery 34).

Thus, since the laptop PC 1 according to the embodiment changes to the hibernation state with extra power left in the battery 34, the content of processing being executed in the normal processing mode before the change to the voice input processing mode (show mode) can be saved safely. Further, for example, when the tent mode is released to resume the normal processing mode, the laptop PC 1 according to the embodiment can resume the processing being executed safely, because extra power is left in the battery 34.

Further, in the embodiment, when the release of the tent mode is detected, the mode control unit 48 returns to the normal processing mode before the change to the voice input processing mode. Upon returning to the normal processing mode before the change, the power setting processing unit 46 changes the setting of the maximum power consumption to the setting before the change to the voice input processing mode.

Thus, since the laptop PC 1 according to the embodiment returns to the state before the change upon returning to the normal processing mode from the voice input processing mode, performance before the change can be obtained, and hence convenience can be further improved.

Further, a control method according to the embodiment is a control method for the laptop PC 1 including the first chassis 101 having at least the display unit 14, the second chassis 102 having at least the input unit 32, and the hinge mechanism 103 which makes the first chassis 101 rotatable with respect to the second chassis 102 while coupling the first chassis 101 and the second chassis 102. The control method includes a mode control step and a power setting processing step. In the mode control step, when tent mode is detected, the mode control unit 48 disables the permission of transition to the sleeping state, and enables the voice input function from the normal processing mode to change to the voice input processing mode in which the processing state of the system is maintained. In the power setting processing step, the power setting processing unit 46 changes, in the voice input processing mode, the setting of the maximum power consumption to the setting lower than the setting in the normal processing mode.

Thus, the control method according to the embodiment has the same effect as the laptop PC 1 according to the embodiment described above. For example, when the laptop PC 1 is operated by the battery 34, the control method can lengthen the available time (operating time) in the voice input processing mode, and hence improve convenience.

Note that the present invention is not limited to the aforementioned embodiment, and changes can be made without departing from the scope of the present invention.

For example, in the aforementioned embodiment, the example in which the mode control unit 48 changes to the setting of the minimum power consumption in the show mode as the setting lower than the setting in the normal processing mode is described, but the present invention is not limited thereto. The mode control unit 48 may change to any other setting as long as the setting is lower than the setting in the normal processing mode.

Further, in the aforementioned embodiment, the example in which, when the laptop PC 1 is operated by power supplied from the battery 34, the power setting processing unit 46 changes the setting of the maximum power consumption to the setting lower than the setting in the normal processing mode is described, but the present invention is not limited thereto. For example, even when the laptop PC 1 is operated by power supplied from the external power supply, the power setting processing unit 46 may change the setting of the maximum power consumption to the setting lower than the setting in the normal processing mode.

Further, in the aforementioned embodiment, even when the laptop PC 1 is operated by power supplied from either of the battery 34 and the external power supply, the user detection processing is performed, but the present invention is not limited thereto. For example, when the laptop PC 1 is operated by power supplied from the external power supply, user's gesture recognition processing or the like may also be performed in addition to the user detection processing.

Further, in the aforementioned embodiment, the example in which, when the tent mode is detected, the mode control unit 48 makes the transition to the show mode (voice input processing mode with the display function) is described, but the transition to the show mode (voice input processing mode with the display function) may be able to be canceled by pressing down a special key or the like.

Further, in the aforementioned embodiment, the example in which the usage form detection unit 47 detects the tent mode according to the value of the opening angle θ is described, but the present invention is not limited thereto. For example, the usage form detection unit 47 may also detect the orientation of the laptop PC 1, the state of being placed on a desk, and the like in addition to the opening angle θ to detect the tent mode by the combination of these detection results. Specifically, when the opening angle θ is larger than or equal to 190 degrees and smaller than 360 degrees, and when the sides of the first chassis 101 and the second chassis 102 opposite to the connection of the hinge mechanism 103 are put down, the usage form detection unit 47 may detect the tent mode. Further, when the opening angle θ is larger than or equal to 190 degrees and smaller than 360 degrees, and when the position of the laptop PC 1 has not been changed for a predetermined period of time, the usage form detection unit 47 may detect the tent mode. Further, the usage form detection unit 47 may detect the tent mode without using the value of the opening angle θ.

Further, in the aforementioned embodiment, the example of the laptop PC 1 as the information processing apparatus is described, but the present invention is not limited thereto. For example, the information processing apparatus may be any other type such as a tablet terminal.

Note that each component included in the laptop PC 1 described above has a computer system therein. Then, a program for implementing the function of each component included in the laptop PC 1 described above may be recorded on a computer-readable recording medium so that the program recorded on this recording medium will be read into the computer system and executed to perform processing in each component included in the laptop PC 1 described above. Here, the fact that "the program recorded on the recording medium is read into the computer system and executed" includes installing the program on the computer system. It is assumed here that the "computer system" includes the OS and hardware such as a peripheral device and the like.

Further, the "computer system" may also include two or more computers connected through a network including the Internet, WAN, LAN, and a communication line such as a dedicated line. Further, the "computer-readable recording medium" means a storage medium such as a flexible disk, a magneto-optical disk, a ROM, a portable medium like a CD-ROM, or a hard disk incorporated in the computer system. The recording medium with the program stored thereon may be a non-transitory recording medium such as the CD-ROM.

Further, a recording medium internally or externally provided to be accessible from a delivery server for delivering the program is included as the recording medium. Note that the program may be divided into plural pieces, downloaded at different timings, respectively, and then united in each component included in the laptop PC 1, or delivery servers for delivering respective divided pieces of the program may be different from one another. Further, the "computer-readable recording medium" includes a medium on which the program is held for a given length of time, such as a volatile memory (RAM) inside a computer system as a server or a client when the program is transmitted through the network. The above-mentioned program may also be to implement some of the functions described above. Further, the program may be a so-called differential file (differential program) capable of implementing the above-described functions in combination with a program(s) already recorded in the computer system.

Further, some or all of the functions described above may be realized as an integrated circuit such as LSI (Large Scale Integration). Each function described above may be implemented individually as a processor, or part or whole thereof may be integrated as a processor. Further, the method of circuit integration is not limited to LSI, and it may be realized by a dedicated circuit or a general-purpose processor. Further, if integrated circuit technology replacing the LSI appears with the progress of semiconductor technology, an integrated circuit according to the technology may be used.

The invention claimed is:

1. An information processing apparatus comprising:
   a first chassis having at least a display unit;
   a second chassis having at least an input unit;
   a rotation mechanism which makes the first chassis rotatable with respect to the second chassis, while coupling the first chassis to the second chassis;
   a mode control unit which, when a tent mode is detected as a state where the first chassis and the second chassis are folded back through the rotation mechanism with a display surface of the display unit and the input unit oriented towards outside of the apparatus, disables permission of transition to a sleeping state in which at least part of system processing is stopped when a display of the display unit is suspended, and enables a voice input function from a normal processing mode to change to a voice input processing mode in which a processing state of the apparatus is maintained; and
   a power setting processing unit which changes, in the voice input processing mode, a setting of maximum power consumption to a power setting lower than a power setting in the normal processing mode.

2. The information processing apparatus according to claim 1, further comprising:
   a user detection unit which detects whether a user is present within a predetermined detection range or not,
   wherein, when the user detection unit detects that the user is present within the predetermined detection range in the voice input processing mode, the mode control unit provides a display of the display unit and, when the user detection unit detects that the user is not present within the predetermined detection range, the mode control unit suspends the display of the display unit.

3. The information processing apparatus according to claim 1, wherein, upon changing to the voice input processing mode, the mode control unit suspends an application being executed before the changing and upon changing from the voice input processing mode to the normal processing mode, the mode control unit resumes the application being executed before the changing.

4. The information processing apparatus according to claim 1, wherein, when the information processing apparatus is in the voice input processing mode and operated by power supplied from a battery, the power setting processing unit changes the setting of the maximum power consumption to the power setting lower than the power setting in the normal processing mode.

5. The information processing apparatus according to claim 1, wherein, in a state where the information processing apparatus is in the voice input processing mode and operated by power supplied from a battery, when a remaining power of the battery becomes a predetermined remaining power capable of executing processing in the normal processing mode or lower remaining power, the mode control unit cancels the voice input processing mode, and changes the apparatus to a hibernation state in which a state before halting the apparatus is saved to a storage unit and power supply is shut down.

6. The information processing apparatus according to claim 1, wherein
   when a release of the tent mode is detected, the mode control unit returns to the normal processing mode before changing to the voice input processing mode, and
   when returning to the normal processing mode before the changing, the power setting processing unit changes the setting of the maximum power consumption to a power setting before changing to the voice input processing mode.

7. A control method for an information processing apparatus including: a first chassis having a display unit; a second chassis having an input unit; and a rotation mechanism which makes the first chassis rotatable with respect to the second chassis while coupling the first chassis to the second chassis, the control method comprising:
   a mode control step in which, when a tent mode is detected as a state where the first chassis and the second chassis are folded back through the rotation mechanism with a display surface of the display unit and the input unit oriented towards outside of the apparatus, a mode control unit disables permission of transition to a sleeping state in which at least part of system processing is stopped when a display of the display unit is suspended, and enables a voice input function from a normal processing mode to change to a voice input processing mode in which a processing state of the apparatus is maintained; and
   a power setting processing step of causing a power setting processing unit to change, in the voice input processing mode, a setting of maximum power consumption to a power setting lower than a power setting in the normal processing mode.

* * * * *